United States Patent

[11] 3,543,658

[72] Inventor Hubertus Reimann
Dresden, Germany
[21] Appl. No. 708,172
[22] Filed Feb. 26, 1968
[45] Patented Dec. 1, 1970
[73] Assignee VEB Pentacon Dresden Kamera-und Kinowerke
Dresden, Germany

[54] PHOTOGRAPHIC CAMERA WITH EXPOSURE CONTROL CIRCUIT
8 Claims, 2 Drawing Figs.

[52] U.S. Cl............................................................ 95/10,
95/53; 250/206; 317/124
[51] Int. Cl........................................................ G03b 7/08;
G01j 1/44
[50] Field of Search........................................... 95/10(C),
53, 64; 250/206; 317/124

[56] References Cited
UNITED STATES PATENTS
| | | | |
|---|---|---|---|
| 3,292,515 | 12/1966 | Sato et al. | 95/10(C)UX |
| 3,292,516 | 12/1966 | Sato et al. | 95/10(C)UX |
| 3,397,629 | 8/1968 | Mori et al. | 95/10(C)UX |
| 3,418,479 | 12/1968 | Schmitt | 95/10(C)UX |
| 3,425,328 | 2/1969 | Ichijo et al. | 95/10(C)UX |
| 3,460,450 | 8/1969 | Ogihara | 95/10(C)UX |

*Primary Examiner*—John M. Horan
*Assistant Examiner*—Joseph F. Peters, Jr.
*Attorney*—Young & Thompson

ABSTRACT: A photographic camera is provided with an exposure control circuit and a resistance device which varies the circuit resistance. A control element sets the exposure timing element of an electronic exposure control circuit of the camera and is adjustable concomitantly with the resistance of the resistance device until a switch influenced by the circuit resistance operates an electromagnetic blocking means. The blocking means when operated prevents further movement of the control element and permits release of the camera shutter.

3,543,658

PHOTOGRAPHIC CAMERA WITH EXPOSURE CONTROL CIRCUIT

BACKGROUND OF THE INVENTION

The invention relates to a camera exposure time control and more particularly but not solely to a single lens reflex camera with an internal measuring system including a photoelectric resistance which determines the exposure time.

Single lens reflex cameras having spring diaphragm may employ internal measuring systems of the so-called "bright measurement" type. If a photoelectric resistance were used to determine directly the exposure time of an electronic exposure time control it would have to adjust itself in the limited time between the moment of switching the diaphragm from its "viewing position" to its "working position" and the moment at which the shutter opens. In other words it would be necessary for the photoelectric resistance to have very low inertia if the light flux passing through the working aperture of the diaphragm is to control the working aperture. Photoelectric resistance however, have too great a degree of inertia for this function.

SUMMARY OF THE INVENTION

The purpose of the invention is to provide an electronic exposure time control system in a camera and to enable an internal light-sensing operation to be carried out which may be employed for a "bright measurement operation" despite the use of a photoelectric resistance as the sensing element.

A problem on which the invention is based is that of providing a single lens reflex camera wherein the exposure time is determined by a photoelectric resistance illuminated by light passing through the camera diaphragm wherein the exposure time is set prior to the transition between the "viewing position" and the "working position" of the diaphragm so that the change in value of the photoelectric resistance during the transition due to the diaphragm aperture change does not influence the exposure time setting. 3 The invention enables this object to be achieved by providing a photographic camera comprising a control circuit including a photoelectric resistance and a resistance device by which the circuit resistance is variable, a switch device operated by said control circuit in dependence upon the circuit conditions thereof, a control element arranged so set the exposure timing mechanism of the camera setting means for simultaneously moving said control element and varying the resistive value of the resistance device, and an electromagnetically operated blocking member controlled by said switch device for securing the control element when the latter is operated.

This enables incorrect exposures resulting from the inertia of the photoelectric resistance to be reliably avoided. The invention may also be used in a single lens reflex camera wherein the control element is movable prior to the closing movement of a "spring diaphragm" for the selection of exposure time circuit resistances for inclusion in an exposure time controlling circuit. The said control element having the capability of being locked when the optimum exposure time circuit resistance is reached, by means of a blocking device controllable by a switching device in the form of a "threshold value switch". The input of the said threshold value switch may be formed of a voltage divider consisting of the photoelectric resistance and of fixed value resistances to be associated with the latter by the control element. The voltage divider is subjected to different voltages according to 5 the preselected working aperture of the spring diaphragm, since the diaphragm selector ring adjusts the position of the tap of a resistance attenuation element, the said tap being connected with the photoelectric resistance. The fixed value resistances may be graduated in their resistance values according to the steepness of the photoelectric resistance while the exposure time circuit resistances may be graduated in accordance with the customary exposure time values. The control element may be advantageously movable by means of the camera release device and may be connected with the latter by means of a slip coupling, so that the release device can easily be moved, after the locking of the control element for the purpose of adjusting the diaphragm and operating the shutter. The position occupied by the control element inside and outside the range of exposure time circuit resistances can be indicated, so that the selected exposure time values can be read and any danger of overexposure or underexposure can be indicated without the use of any additional measuring mechanism.

BRIEF DESCRIPTION OF THE DRAWINGS

The invention will be explained below in conjunction with a practical example. The diagrams are as follows.

DESCRIPTION OF PREFERRED EMBODIMENT

Figure 1:
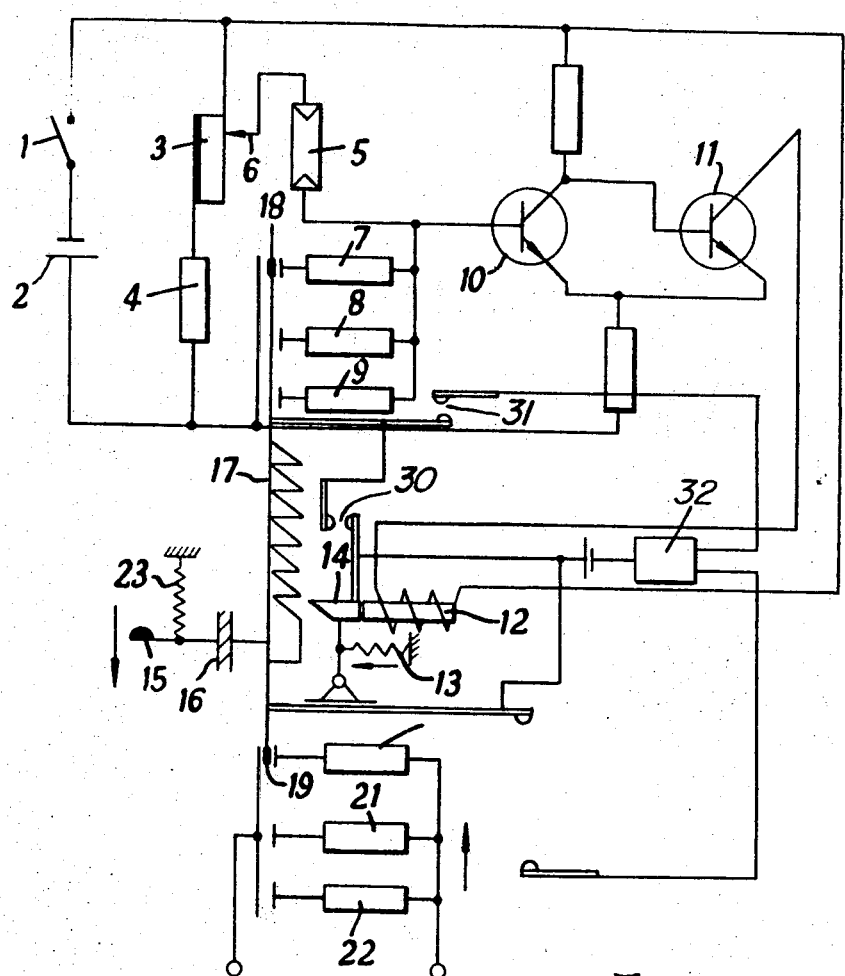
FIG. 1 is a schematic diagram of one embodiment of the invention.

FIG. 1, a resistance 4 and a resistance attenuation element with logarithmic attenuation characteristics are connected in parallel with a voltage source 2 which can be switched on by means of a switch on by means of a switch 1. This resistance attenuation device is mounted in the camera objective assembly which is not shown in the drawing, and its attenuation characteristics, e.g. 3 $dB$ per stage, correspond to the steepness of the photoelectric resistance 5. The taps 6 of the attenuation device lead to the photoelectric resistance 5, which, together with fixed value resistances 7, 8 and 9, form a voltage divider. The graduation of these fixed resistances is likewise for example 3 $dB$, the values being graduated in ascending resistance from 7 to 9.

The voltage divider forms the input of a switch device in the form of a threshold value switch which consists of transistors 10 and 11 and which controls a locking device consisting of a magnet 12 and a blocking member in the form of an armature 14, the latter being controlled by the spring 13. The camera release device 15 is connected via a slip coupling 16 with a scanning device consisting of a rack 17 and sliding contacts 18 and 19 mounted on the respective sides of the said rack. By means of a sliding contact 19, time circuit resistances 20, 21 and 22 can be included in an electronic time formation circuit not shown in the circuit, the time circuit resistances are combined to form one constructional unit and are displaceable towards the sliding contacts 19 in the direction shown by the arrow. The graduation time circuit resistances in relation to one another amounts to 6 $dB$.

The method of operation is as follows:

FIrst of all, in order to take the film speed into account, the time circuit resistances 20, 21 and 22 are moved in relation to the sliding contact 19 in the direction shown by the arrow. The necessary working diaphragm aperture, with which the photograph is to be taken, is then preselected.

As the resistance attenuation device 3 is built into the camera objective assembly and the diaphragm preselection mechanism is coupled with taps 6 of the resistance attenuation device 3, the attenuation and thus the voltage applied to the voltage divider is then varied in accordance with the preselected working diaphragm aperture. In accordance with the brightness prevailing and the working diaphragm aperture selected, a greater or smaller deviation from the response voltage of the threshold value switch is thus produced. In order to return to this response voltage the release device 15 is operated, in order to move the scanning device and thus the sliding contact 18 until one of the fixed resistances 8 and 9, which results in the threshold voltage, is associated with the photoelectric resistance 5. Let us assume that at given light conditions the threshold voltage is reached when, via the sliding contact 18, the fixed resistance 8 in conjunction with the photoelectric resistance 5 forms the voltage divider. When the control element is in this position the threshold value switch responds, so that the holding magnet 12 is influence and the armature 14, under the action of the spring 13, engages the rack 17, preventing the latter from moving any farther. The movement of the contact 19 is automatically connected with that of the contact 18, so that the exposure circuit resistance 21 has been included in the time determining circuit via the contact 19 when the control element is blocked. This resistance is the best resistance for correct exposure, in accordance with the brightness prevailing and with the preselected diaphragm aperture, and is stored in the exposure time circuit, until the operation of taking the photograph has been completed, owing to the fact that the control element is blocked. The position of the sliding contact in the range of the time exposure circuit resistance is rendered visible in the viewfinder of the camera, so that the exposure time to which the latter has been set can be read before each photograph is taken. Owing to the slip coupling 16, the release device 15 can now be pressed to a greater distance, so that as the sequence of operations continues the spring diaphragm is first released, after which the shutter is released. Owing to the storage of the resistance 21, as described the reduction in the illumination of the photoelectric resistance 5, resulting from the diaphragm closing movement and causing a change of value of the photoelectric resistance does not affect the exposure time determination.

As soon as the release device 15 is once again enabled to act, the scanning device returns to its position of rest, under the action of the spring 23. For this purpose the rack 17 is constructed in such a manner that this reverse movement cannot be accomplished by any blocking by the armature 14, this latter being, on the contrary, lifted out and once again caused to come to rest against the magnet 12. The camera is thus in readiness for a further "take".

If a photograph is to be taken with a smaller working diaphragm aperture than that hitherto described, or under less intensive light conditions, then the scanning device must once again be pressed as far as it will go, i.e. until the greater fixed resistance 9 or a resistance following the latter is connected to the photoelectric resistance 5. The threshold value switch now responds and the armature 14 drops away will now block the scanning device in this position, in which, via the sliding contact 19, the greater time circuit resistance 22 is included in the exposure time circuit. Owing to the greater time circuit resistance 22 the exposure time is increased to the required extent.

If the threshold voltage has already been reached when the scanning device is still in its upper end position, so that the fixed resistance 7 is still associated with the photo resistance 5, which conditions would correspond to the danger of overexposure, then an incandescent lamp 32 lights up in the view finder of the camera. The current circuit of the said lamp includes for this purpose, a further switching means 30 and 31 which is closed when the control element is in the upper end position and the armature 14 in the "dropped" position, so that under the circumstances described in the foregoing becomes the current circuit is closed and the lamp comes on.

In order to indicate the danger of underexposure the current of this incandescent lamp 32 or of an additional lamp includes a further switch 33 which is closed by the control element as soon as the sliding contact 19 has been moved beyond the last of the exposure time circuit resistances without the rack having been thereby blocked.

Figure 2:
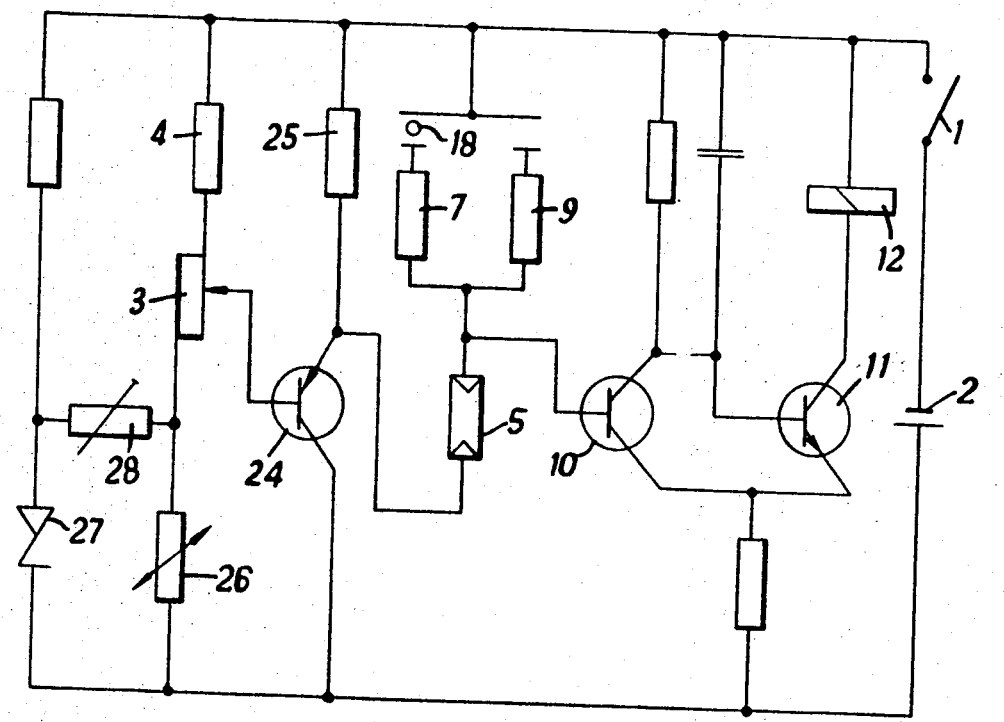
FIG. 2 is a schematic diagram of an alternative embodiment having a threshold value switch with a locking device.

FIG. 2 shows a further constructional version of the threshold value switch, in which an impedance converter consisting of a transistor 24 and a resistance 25 has been connected in between the resistance attenuation device 3 and the photoelectric resistance 5. This ensures that the feed voltage for the photoelectric resistance 5 remains independent of its value. A thermistor 26 is used to reduce the temperature dependence of the response voltage of the threshold value switch. By the aid of a Zener diode 27, an adjusting regulator 28 and the thermistor 26, the threshold voltage variation, a particular disadvantage in the case of silicon transistors, is compensated, as these switching elements generate a voltage corresponding approximately to the means value of the threshold voltages of the transistors 10 and 11.

I claim:

1. In a photographic camera including the camera housing having a shutter device arranged thereon, a shutter release mechanism, and an electronic circuit for controlling the exposure time of said shutter device, the provision of an exposure control circuit comprising a source of supply voltage, a photoelectric resistance influenced constantly by prevailing light condition, a first variable resistance device connected in a series arrangement with the photoelectric resistance, which series arrangement is connected in circuit with the source of supply voltage, a switching device connected with the photoelectric resistance and the variable resistance device and influenced in operation by the voltage occurring at the connection, a second variable resistance device arranged in circuit with and forming an exposure time determining element of the electronic exposure control circuit, a control element movable by the shutter release device which control element is operatively connected to each of the variable resistance devices to provide concomitant movement thereof and an electromagnetic blocking element operatively connected with the switching device for securing the control element when the switching device is operated to set the second variable resistance device to a value dependent on the prevailing light conditions and thereafter permit the shutter to be released by the shutter release device.

2. A photographic camera according to claim 1, wherein the variable resistance devices each comprises a plurality of individually selectable resistors.

3. A photographic camera according to claim 1, wherein the second variable resistance device is variable relative to the first variable resistance device independently of the control element in accordance with the sensitivity of the particular film used.

4. A photographic camera according to claim 1, including a switch means, operable when the control element is at one end of its range of movement and the electromagnetic blocking element is blocking the control element, to indicate the danger of overexposure by connection of a supply voltage to an indicator lamp and another switch which when operated is effective to indicate the danger of under exposure by connection of a supply voltage to an indicator lamp.

5. A photographic camera according to claim 1, wherein the control element is coupled to the release device of the camera by means of a slip coupling whereby operation of the release device is effective to vary the variable resistance devices until the control element is blocked by the electromagnetic blocking element whereupon the release device moves relative to the control element and initiates operation of the camera shutter.

6. A photographic camera according to claim 1, wherein the source of supply voltage includes a resistance attenuation element in a parallel arrangement therewith and effective in operation to influence the voltage occurring at the connection between the photoelectric resistance and the first variable resistance device.

7. A photographic camera in accordance with claim 6, wherein the photoelectric resistance is influenced by light passing through the diaphragm aperture in its fully open position and the blocking element secures the control element prior to the commencement of the diaphragm closing movement.

8. A photographic camera, according to claim 6, wherein an impedance converter stage is connected between the resistance attenuation element and the photoelectric resistance to reduce the loading effect of the change of resistance of the photoelectric resistance on the supply voltage.